A. C. HEINY.
APPARATUS FOR CHANGING DIRECT ELECTRIC CURRENTS INTO INTERRUPTED ALTERNATING CURRENTS.
APPLICATION FILED JAN. 8, 1910. RENEWED MAR. 2, 1917.
1,242,549. Patented Oct. 9, 1917.
5 SHEETS—SHEET 5.
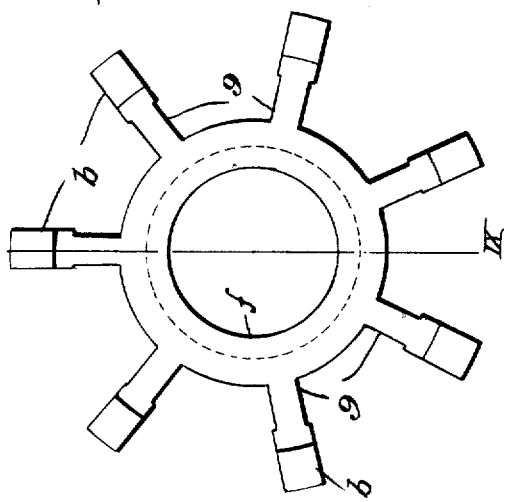
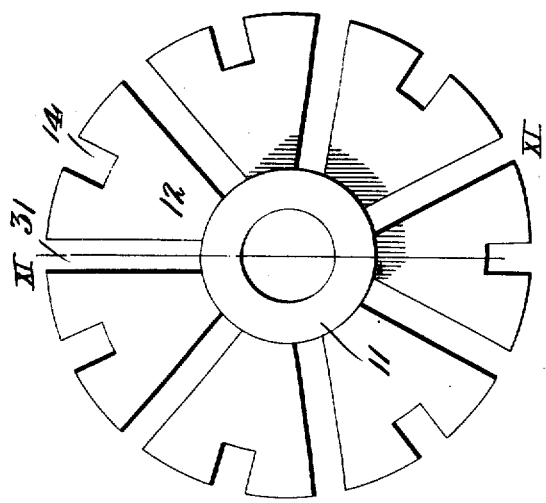
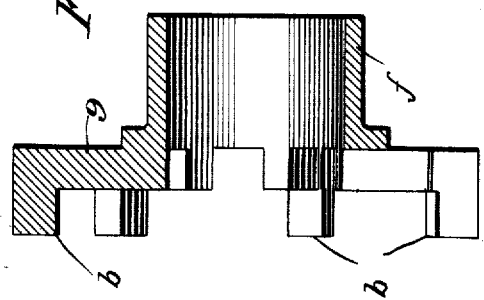
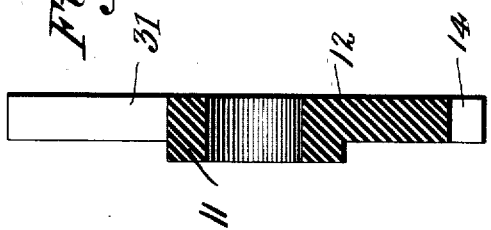
Witnesses
Jo H Collins
H. B. Marston
Inventor
Anatole C. Heiny
By J. S. Barker
his Attorney

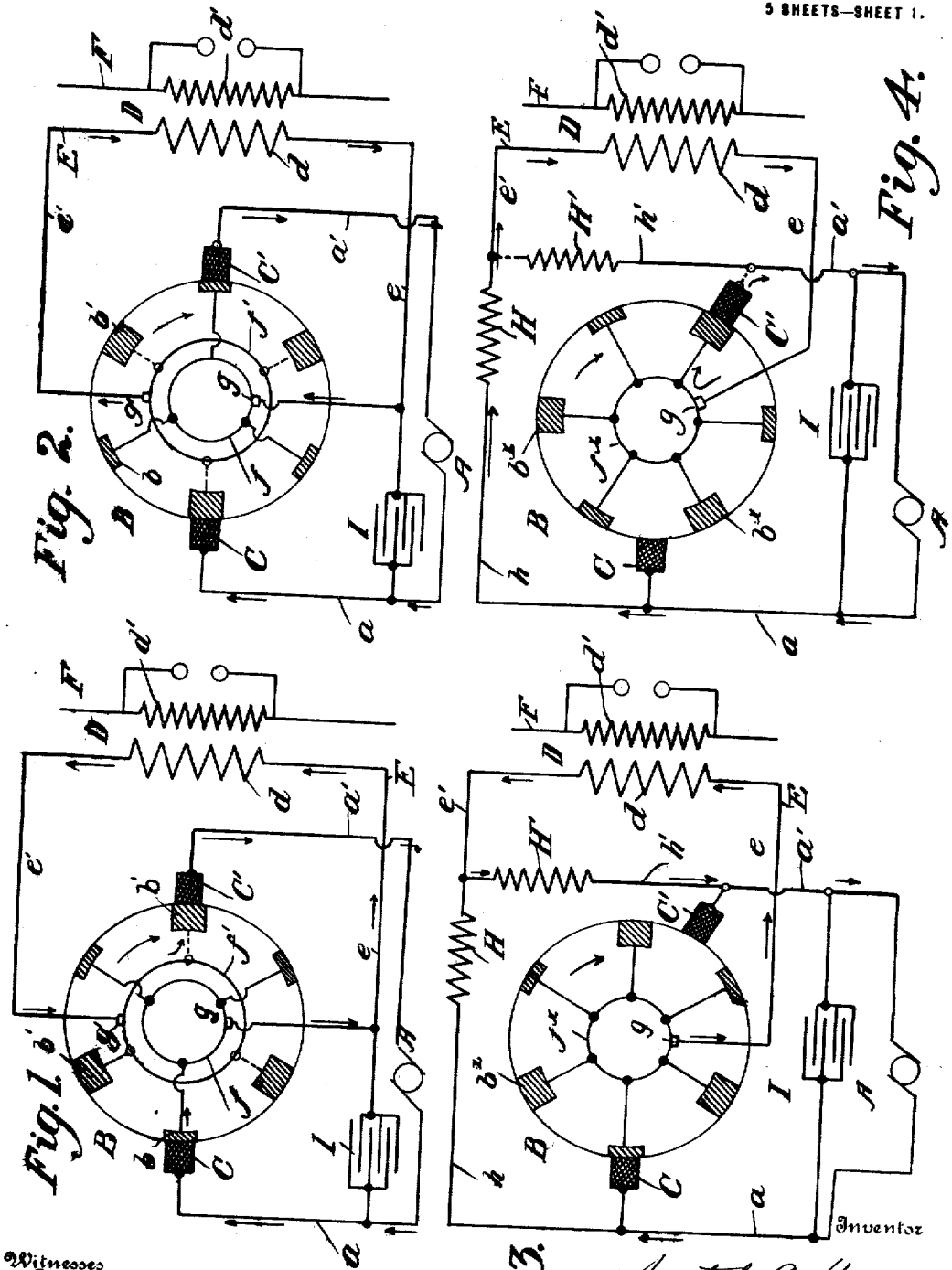

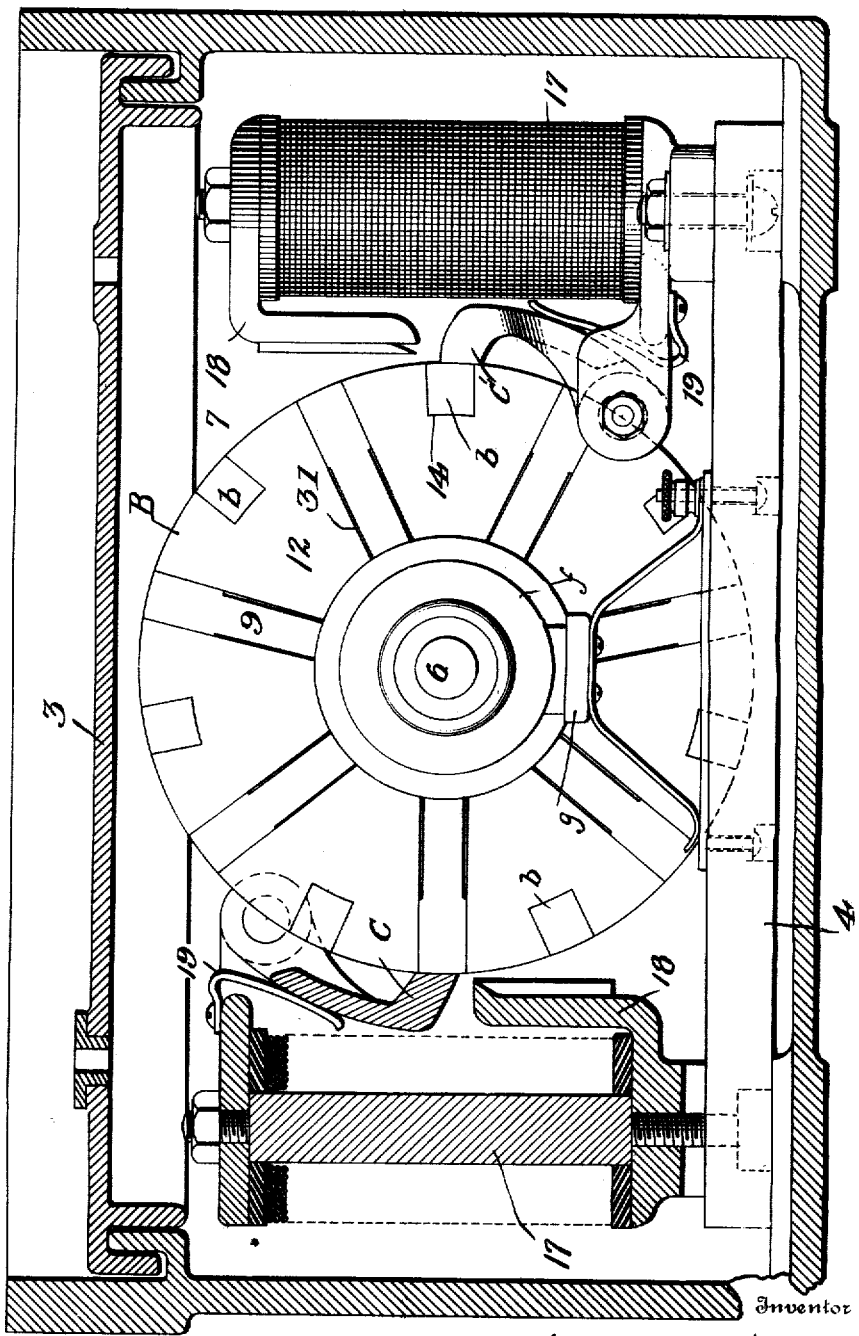

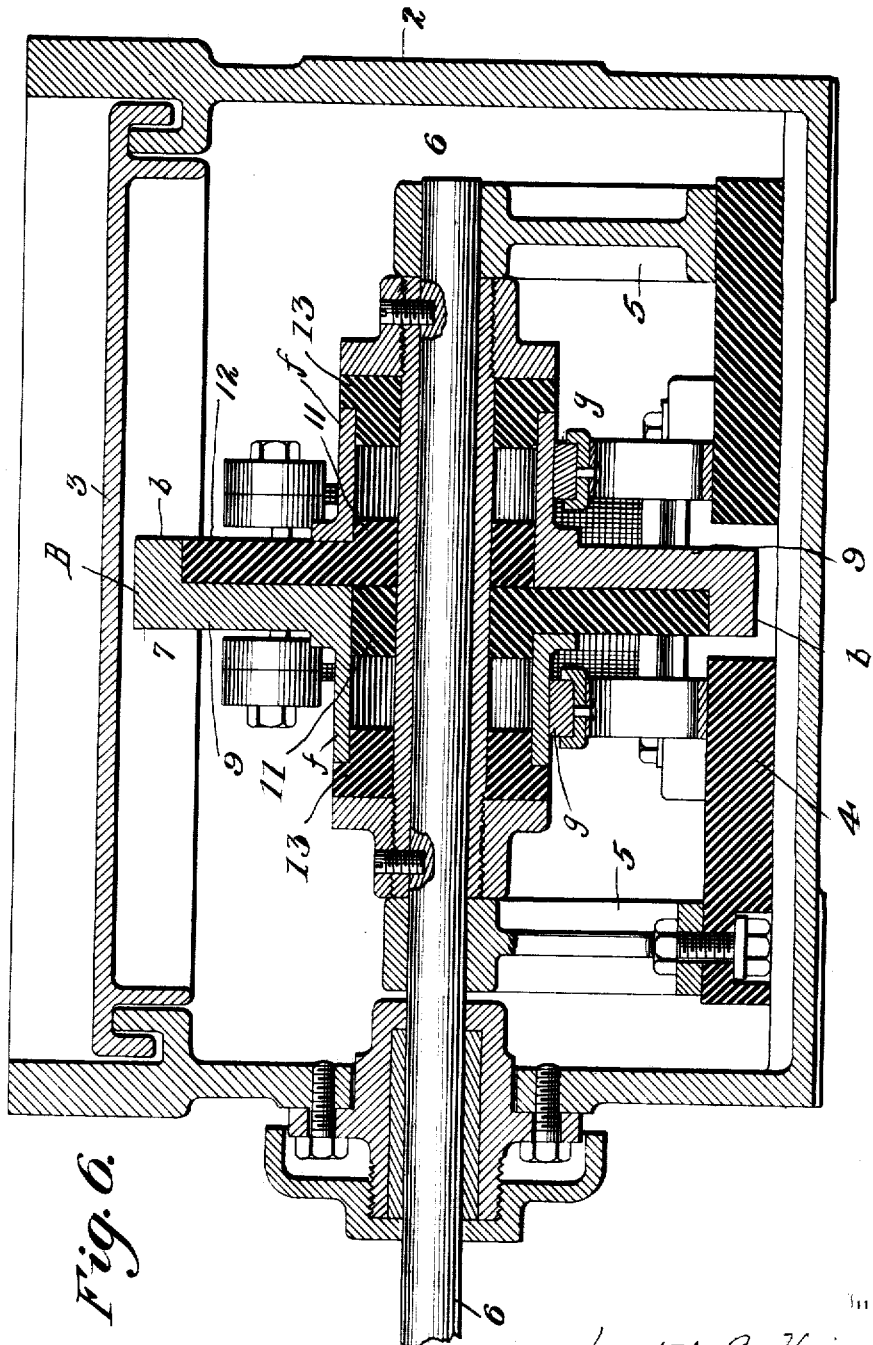

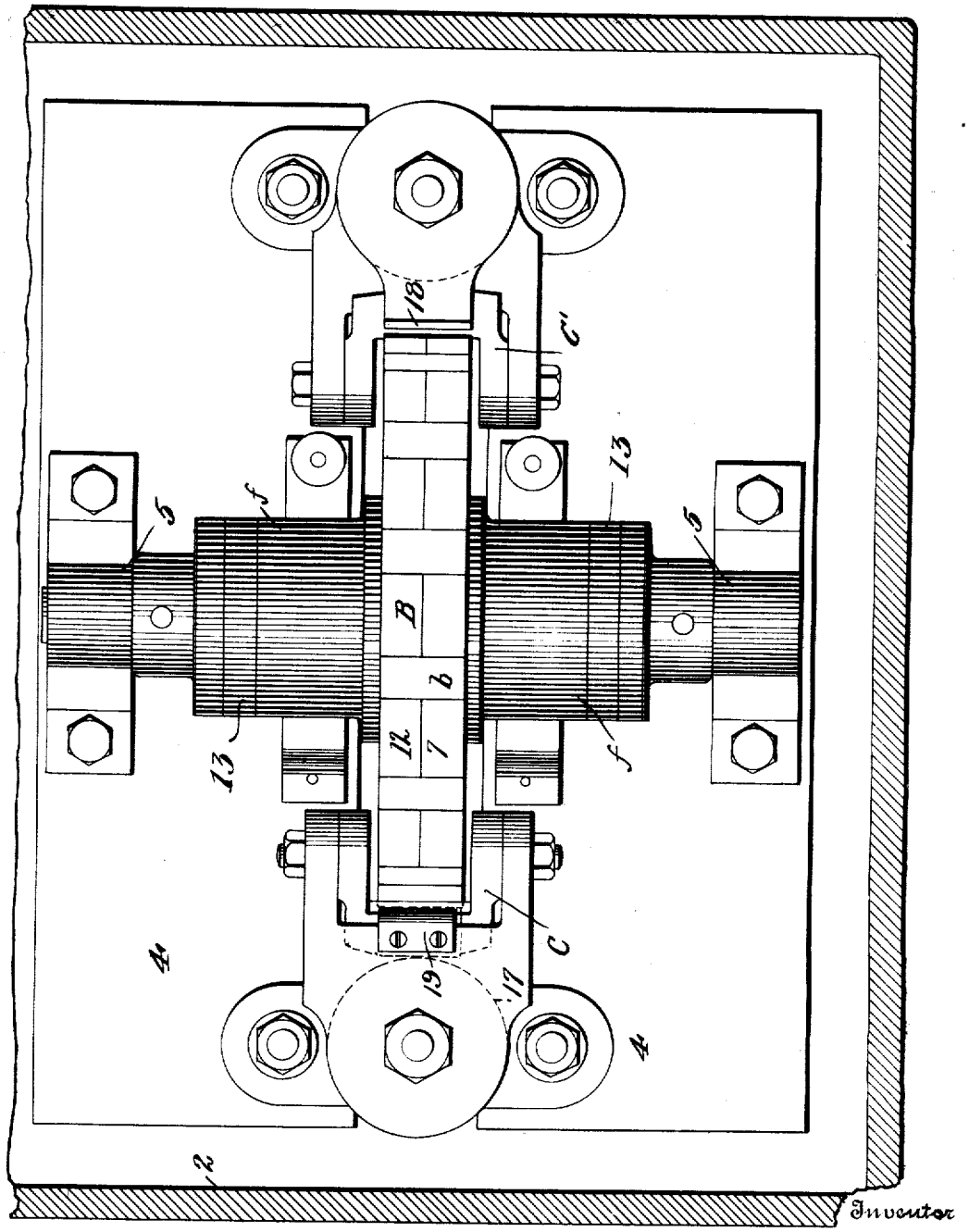

UNITED STATES PATENT OFFICE.

ANATOLE C. HEINY, OF NEW YORK, N. Y.

APPARATUS FOR CHANGING DIRECT ELECTRIC CURRENTS INTO INTERRUPTED ALTERNATING CURRENTS.

1,242,549.  Specification of Letters Patent.  Patented Oct. 9, 1917.

Application filed January 8, 1910, Serial No. 536,999. Renewed March 2, 1917. Serial No. 152,154.

*To all whom it may concern:*

Be it known that I, ANATOLE C. HEINY, a citizen of the United States, residing at New York city, in the county and State of New York, have invented new and useful Improvements in Apparatus for Changing Direct Electric Currents into Interrupted Alternating Currents, of which the following is a specification.

My invention has for its object to produce a system, and apparatus by which the system may be put into operation, for converting a direct or continuous electric current obtained from any suitable source into an interrupted current, the periods of rest or no flow, following periods of flow or current movement, being of a duration approximating the duration of the periods of flow, preferably not less than one-half and not greater than one and one-half that of the duration of the periods of current movement or flow; and the direction of the flow of current in succeeding periods of movement thereof being reversed. The interrupted current of the character stated may be used for electric lighting, for transmission of power, or in the primary of step-up transformers or step-down transformers, etc.

As the principle of my invention may be carried out in many ways it is only necessary for an understanding of the same to describe it in connection with one type of apparatus; and I therefore have chosen for purposes of illustration to represent the invention as used in connection with the primary coil of a step-up transformer, in which a direct current passing through such primary coil is interrupted and alternately reversed. The interrupted current does not materially vary in voltage from one period to another, notwithstanding its interruptions, being in this respect unlike an alternating current which rises from zero to its greatest intensity and then falls back to zero between each alternation. From this it follows that the induced current in the circuit of the secondary coil of the transformer is an interrupted and alternating current, but one in which the voltage does not materially rise and fall or undulate and which is of higher tension than the current in the primary coil.

In the accompanying drawings the theory or principle of the invention is illustrated by diagrammatic views; and there is also illustrated a form of apparatus embodying features of the invention, adapted to be used in carrying out the process.

Referring to such figures—

Figures 1 and 2 are diagrammatic views illustrating one method or process of changing or converting a direct electric current into one of interrupted alternating character embodying my invention, the views illustrating the parts of the apparatus in different positions.

Figs. 3 and 4 are diagrams illustrating, in different positions, another method of carrying out my invention.

Fig. 5 is a view partly in vertical section and partly in end elevation illustrating an interrupter embodying features of my invention.

Fig. 6 is a central longitudinal vertical section of the apparatus shown in Fig. 5.

Fig. 7 is a view partly in top plan and partly in horizontal section illustrating the same apparatus.

Fig. 8 is a detail view in end elevation illustrating one of the conducting parts of the movable element of the interrupter.

Fig. 9 is a section taken on the line IX—IX of Fig. 8.

Fig. 10 is a detail view, in elevation, illustrating one of the insulating elements of the movable part of the interrupter.

Fig. 11 is a sectional view on the line XI—XI of Fig. 10.

Referring to Figs. 1 to 4, inclusive, A represents a direct current generator which may be of any usual or preferred character, and from which lead the supply conductors or mains $a$, $a'$. B indicates an interupter of any suitable character connected across the mains $a$, $a'$. In the form of invention illustrated in Figs. 1 and 2, the interrupter is represented as being provided with conducting contacts $b$, $b'$ arranged in two sets alternating with each other, the contacts of each set being electrically united. Brushes or contact pieces C, C' connected respectively with the mains $a$, $a'$ engage with the contact pieces of the interrupter as the latter is revolved.

D indicates a step-up transformer, the primary coil $d$ of which is in a branch line E extending from the interrupter, while the secondary coil $d'$ is in the line F over which passes the transformed current of high potential and alternating character.

The primary coil of the transformer is directly connected, through the interrupter, with the main circuit $a$, $a'$. The wiring of the interrupter and the connections of the circuit E therewith are such (though both the said wiring and connections may be varied, as will be explained) that whenever the interrupter is driven, turning for instance in the direction indicated by the arrow, the current through the coil $d$ will be interrupted, with a frequency dependent upon the speed of the interrupter, and the direction of the current, in passing through the coil will, between each interruption, be reversed. In practice the interrupter is driven at such speed that the circuit is broken and the flow of current interrupted with a frequency dependent upon the use to which the interrupted current being produced is put, and which may be from a few thousand to over twenty thousand interruptions per minute. This interrupted and alternating current in passing through the primary coil of the transformer induces in the secondary coil, and in the circuit F of which it is a part, a current also interrupted, that is, with periods of rest or no flow between the periods of current flow or movement, and with the current alternately reversed in direction after each interruption, the potential of the current in the circuit F being greater than that in the circuit of which the primary coil is an element.

The contacts $b$ are united by a conductor $f$ which may be a collecting ring with which engages a brush $g$ carried by the branch $e$ of the circuit E leading to one end of the primary coil of the transformer. The branch $e'$ leading from the other end of the coil engages, by brush or collector $g'$, with a ring $f'$ constituting the conductor that unites the series of contacts $b'$.

I designates a condenser interposed between one of the mains of the circuit from the generator and a branch of the shunt circuit E in which is situated the primary coil $d$. The condenser operates to prevent undesirable sparking as the circuit is successively broken by the movements of the interrupter.

The brushes C, C' are arranged to engage simultaneously with contacts $b$, $b'$, belonging respectively to the two sets of contacts already described, as indicated in Figs. 1 and 2. When the moving element of the interrupter occupies a position intermediate between that illustrated in these two views the brushes C simultaneously engage with insulating portions of the interrupter or are out of engagement with any conducting part of the apparatus.

The parts being in the position indicated in Fig. 1 the current passes from the generator along the main $a$ to the contact $b$ at the interrupter, thence to the collecting ring $f'$, with which the brush or collector $g$ is connected, and by the wire $e$ to the primary coil of the transformer. From the coil the current returns by the wire $e'$ to the ring $f'$ of the interrupter, thence to the contact $b'$ with which the brush C' of the main $a'$ is in engagement, and by the main back to the generator. The moving element of the interrupter, turning in the direction indicated by the arrow, carries the contacts thereof out of engagement with the brushes C, C' and the current is momentarily interrupted, to be followed by a reëstablishment of the current upon the parts assuming the position indicated in Fig. 2. By tracing the circuit followed by the current, as indicated by the arrows, it will be seen that while its direction through the main circuit is uniform or constant, it travels, in the shunt circuit E, and hence through the coil $d$, in a direction opposite to that it followed when the parts were arranged as shown in Fig. 1.

Referring now to Figs. 3 and 4, it will be seen that all of the contacts $b^x$ carried by the moving element of the interrupter are connected with a ring or collecting conductor $f^x$ with which one of the wires, $e$, of the circuit that includes the primary coil of the transformer, has electrical connection as by means of a brush or collector $g$. The brushes, C, C', are so disposed that they cannot both engage simultaneously with contacts $b^x$. They shall, however, both be in engagement with an insulating part of the interrupter simultaneously for a moment of time after each has successively passed from engagement with a contact $b^x$.

The wire $e'$ of the circuit E does not, as in the arrangement first described, connect with the interrupter, but instead is connected with both mains, $a$, $a'$ of the circuit, by branches, designated $h$, and $h'$, respectively. In these branches are arranged resistances H, H'. The resistance to the flow of the current offered by either resistance, H or H', is much greater than that offered by the coil $d$, so that while the two mains $a$, $a'$ are always directly united by the wires $h$, $h'$, the current will not take the path just indicated owing to its having to pass both resistances in so doing, so long as it can find a path through the coil $d$ of the transformer.

The parts being in the position represented in Fig. 3 the circuit followed by the current may be traced as follows: from the generator by the main $a$ to the interrupter, thence by the wire $e$ of the circuit E to the primary coil of the transformer whence it passes out by the wire $e'$, through the resistance H' and wire $h'$ to the main $a'$, and by this, back to the generator. The movable element of the interrupter turning in the direction indicated by the arrow causes an interruption of the current in moving from the position indicated in Fig. 3 to that indicated in Fig. 4. When the parts arrive at the position indicated in the latter view the circuit taken by the current may be traced as follows: from the main $a$, over the wire $h$, through the resistance H, and by wire $e'$ to the primary coil of the transformer, whence it passes by the wire $e$ to the collecting ring $f^x$ of the interrupter, and thence, by the contact $b^x$ and brush C', to the other main $a'$.

From these two illustrations of the process it will be seen that while the current in the main line $a$, $a'$ remains continuous or of one direction, that passing through the primary coil of the interrupter is repeatedly reversed, as well as interrupted.

In Figs. 5 to 11 of the drawings I have illustrated the form of interrupter which I prefer to employ in carrying out the process already described, and which embodies features of my invention. It is represented as being mounted in a case 2 which should be liquid tight so as to contain oil when it is desired to mount the interrupter in such liquid in order to prevent sparking. The case may be provided with a cover 3. An insulating base or support 4 is arranged within the case and from it rise pedestals 5, in which is mounted the shaft 6 of the rotary element B of the interrupter. The shaft at one end extends out through the wall of the casing so that it may be driven from any suitable source of power. Mounted upon the shaft and turning therewith, is a disk 7 comprising a pair of metallic conducting members, one of which is illustrated in detail in Figs. 8 and 9. Each of these metallic parts consists of a central hub constituting a collecting ring $f$ and a series of arms 9, radiating from one end of the hub, the ends of the arms being shaped as indicated to constitute the conducting contacts $b$ of the disk 7. A pair of these metallic pieces is supported upon the shaft, they being held apart by insulating pieces like that represented in Figs. 10 and 11, each consisting of a hub 11 fitting the shaft and a set of radiating segments 12 carried thereby.

13, 13 are insulating pieces interposed between the shaft 6 and the hubs of the conducting elements of the rotating member of the interrupter, being inserted into the outer ends of the hubs as represented in Fig. 6. The inner end of each metallic hub—that end from which extend the radiating arms 9—is mounted upon the hub 11 of one of the insulating disks, and the arms 9 lie in the slots 31 separating the segments 12. The two insulating disks come together face to face, the segments 12 of one disk overlying the slots 31 of the other. In the ends of the segments there are formed notches or recesses 14 in which lie the ends $b$ of the radiating arms of the conducting pieces.

The parts of the rotating element of the interrupter when assembled as described, form a commutator comprising a disk having two sets of peripheral contacts $b$ alternating with each other and respectively connected with collecting rings $f$ arranged at opposite faces of the disk.

Upon these hubs or collecting rings, $f$, bear brushes $g$ constituting the terminals of the wires of the circuit E in which is included the primary coil of the transformer. These brushes may be of any suitable style and construction and need not be described in detail.

C, C' indicate the brushes that bear upon the periphery of the disk 7 of the interrupter, they being connected with the wires or mains $a$, $a'$ receiving direct current from the generator. While these brushes may be of any usual or approved construction, I prefer that they should be formed as shown and each constitute one pole of a magnet 17 employed to blow out or dissipate the sparks produced at the periphery of the commutator disk. These magnets are energized by current derived from any suitable source and are formed with stationary poles 18 arranged adjacent to the periphery of the disk 7 and to the contact ends of the other poles, constituting the contact brushes C, C'. The latter are pivotally supported and held against the face of the disk by springs 19.

The form of apparatus illustrated in Figs. 5, 6 and 7 is adapted to carry out the particular method of operation illustrated in Figs. 1 and 2.

It may be easily adapted for use in connection with the method illustrated in Figs. 3 and 4. If the apparatus illustrated were so used without any change whatever, it would only be necessary to disconnect one of the brushes $g$ from the circuit E and to connect up the wire thus disconnected with the conductors $h$, $h'$ including the resistances H, H', as indicated in Figs. 3 and 4. If the apparatus illustrated in detail were used in this method of operation, it would be better if all the contacts $b$ were connected with one collecting ring $f$, as diagrammatically illustrated in Figs. 3 and 4.

The first method of carrying out the invention, that illustrated in Figs. 1 and 2, is the one preferably used when the cost of current is an item of considerable importance; whereas the second method, illustrated in Figs. 3 and 4, is to be preferred where the cost of current is of little or no object. Again, the first method is preferably used for purposes of transforming currents of large volume by the use of a closed core transformer, while the second has advantages for use in transforming currents of relatively small volume into very high potential currents by the use of transformers with open cores such as the Ruhmkorff coil type.

What I claim is:—

1. In apparatus for converting a direct electric current into an alternating current of different potential, the combination of a direct current generator, an interrupter for breaking the current of the generator with great frequency, having means arranged to cause the interruptions to approximate in duration the periods of current flow and at the same time cause the reversal of the direction of the current with each interruption and a transformer, the primary of which is connected with and takes current from the said interrupter.

2. In apparatus for converting a direct electric current into an interrupted current, the combination of a direct current generator, a closed circuit of relatively high resistance connected with the opposite poles of the generator, a shunt circuit of less resistance than the said closed circuit, including the coil of a transformer, and an interrupter in the said shunt circuit.

3. In apparatus for converting a direct electric current into an alternating current, the combination of a direct current generator, a closed circuit of relatively high resistance connected with the opposite poles of the said generator, a shunt circuit of less resistance than the closed circuit, including the primary coil of a transformer, and an interrupter in the said shunt circuit arranged to break the electric current with great frequency and to reverse the direction of the current flow through the shunt circuit with each break thereof.

4. An apparatus for converting a direct electric current to an alternating one of different potential comprising a circuit to which the direct current is supplied, a branch circuit in which is included artificial resistance, for closing the said direct current circuit, a shunt circuit including a coil of a transformer connected with the said branch circuit at a point dividing the resistance therein so that a part of the resistance is on each side of the connection, the resistance of the parts of the branch circuit on each side of the connection with the shunt circuit being greater than the resistance of the said coil of the transformer, and an interrupter between the two mains of the direct current circuit and to which one branch of the shunt circuit is connected arranged to divert the current from the main circuit to the shunt circuit in an interrupted manner and to reverse the direction of the current in said circuit with each interruption.

5. An apparatus for converting a direct electric current to an alternating one of different potential, comprising a main circuit to which the direct current is supplied, a branch circuit in which are included artificial resistances, uniting the conductors of the main circuit, a shunt circuit including the primary coil of a transformer connected with the branch circuit between the said resistances, the resistance of the said coil of the transformer to the flow of current being much less than that of either resistance in the said branch circuit, and an interrupter having separated insulated contacts with which brushes connected respectively with the conductors of the main circuit successively engage, the said contacts of the interrupter being electrically connected with the said shunt circuit, the interrupter being arranged to direct the current from the main line through the shunt line in successively opposite directions, and also to interrupt the flow of the current between each change in its direction.

6. An interrupter for use in apparatus for converting electricity comprising a rotary element, consisting of a shaft and a disk carried by the shaft and formed of an insulating piece having a hub supported by the shaft and segments radiating from the said hub, and a conducting piece supported by said insulating piece and having a hub constituting a collecting ring and a series of radiating arms lying in the spaces between the segments of the said insulating piece and extending to the periphery of the latter.

ANATOLE C. HEINY.

Witnesses:
M. CALPING,
JAMES McBRICK.